(12) United States Patent  
Christ et al.

(10) Patent No.: US 9,014,936 B2
(45) Date of Patent: Apr. 21, 2015

(54) METHOD FOR THE APPROXIMATE DETERMINATION OF THE TORQUE WHICH IS ACTUALLY TRANSMITTED BY A CLUTCH OF A DRIVE TRAIN OF A VEHICLE

(71) Applicant: Bayerische Motoren Werke Aktiengesellschaft, Munich (DE)

(72) Inventors: Thomas Christ, Munich (DE); Felix Lins, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/221,956

(22) Filed: Mar. 21, 2014

(65) Prior Publication Data

US 2014/0207349 A1    Jul. 24, 2014

Related U.S. Application Data

(63) Continuation of application No. PCT/EP2012/068473, filed on Sep. 20, 2012.

(30) Foreign Application Priority Data

Oct. 20, 2011    (DE) .......................... 10 2011 084 844

(51) Int. Cl.
*G06F 17/00*    (2006.01)
*F16D 48/06*    (2006.01)
(Continued)

(52) U.S. Cl.
CPC ............... *F16D 48/06* (2013.01); *B60W 10/02* (2013.01); *F16D 48/066* (2013.01); *B60W 2510/0275* (2013.01); *F16D 2500/1066* (2013.01); *F16D 2500/30425* (2013.01); *F16D 2500/708* (2013.01); *B60W 20/102* (2013.01); *F16H 2061/0093* (2013.01); *F16H 2342/044* (2013.01)

(58) Field of Classification Search
None
See application file for complete search history.

(56) References Cited

U.S. PATENT DOCUMENTS 6,594,573 B1    7/2003    Rossmann et al.
8,463,517 B2    6/2013    De Rinaldis et al.

FOREIGN PATENT DOCUMENTS

DE    100 60 642 A1    6/2002
FR    2 921 453 A1    3/2009
(Continued)

OTHER PUBLICATIONS

International Search Report (PCT/ISA/220 & PCT/ISA/210) with English translation dated Jan. 17, 2013 (8 pages).
(Continued)

*Primary Examiner* — Dirk Wright
(74) *Attorney, Agent, or Firm* — Crowell & Moring LLP

(57) ABSTRACT

A method for approximately determining the torque actually transmitted by a clutch of a drive train of a vehicle, includes the steps of: setting a closed state of the clutch and transmitting a torque by way of the drive train, providing a state space model showing the drive train, particularly a Kalman filter, determining a torque which can theoretically be transmitted or is transmitted by the clutch in the closed state, and approximately determining the torque actually transmitted by the clutch, by adding the theoretically transmittable or transmitted torque and a disturbance torque determined by calculation, wherein the disturbance torque is determined on the basis of the state space model and actual rotational speeds of individual drive train components and/or of actual torques transmitted by individual drive train components.

6 Claims, 1 Drawing Sheet

(51) Int. Cl.
*B60W 10/02* (2006.01)
*B60W 20/00* (2006.01)
*F16H 61/00* (2006.01)

(56) References Cited

FOREIGN PATENT DOCUMENTS

| WO | WO 01/20200 A1 | 3/2001 |
| WO | WO 2010/028990 A2 | 3/2010 |

OTHER PUBLICATIONS

German Search Report with partial English translation dated Jul. 31, 2012 (12 pages).

Beck, R. et al. "Model Predictive Control of a Parallel Hybrid Vehicle Drivetrain," Proceedings of the 44$^{th}$ IEEE Conference on Decision and Control, and the European Control Conference 2005, Seville, Spain, Dec. 12-15, 2005, pp. 2670-2675.

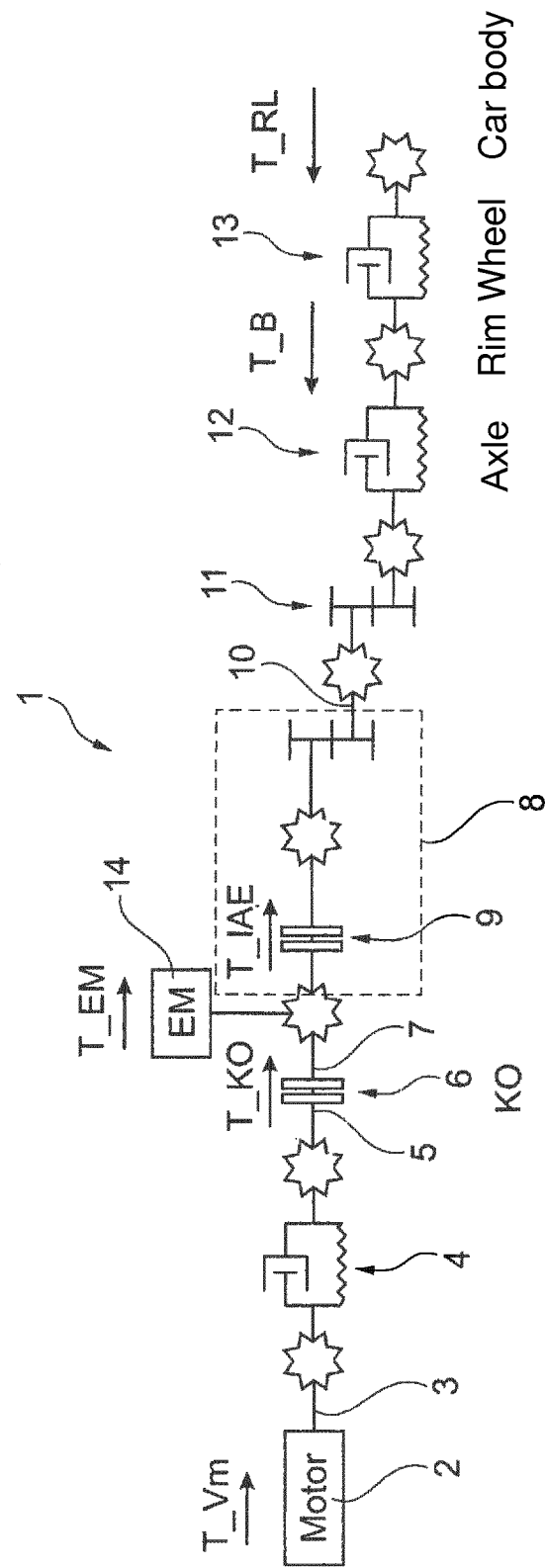

METHOD FOR THE APPROXIMATE DETERMINATION OF THE TORQUE WHICH IS ACTUALLY TRANSMITTED BY A CLUTCH OF A DRIVE TRAIN OF A VEHICLE

CROSS REFERENCE TO RELATED APPLICATIONS

This application is a continuation of PCT International Application No. PCT/EP2012/068473, filed Sep. 20, 2012, which claims priority under 35 U.S.C. §119 from German Patent Application No. 10 2011 084 844.4, filed Oct. 20, 2011, the entire disclosures of which are herein expressly incorporated by reference.

BACKGROUND AND SUMMARY OF THE INVENTION

The present invention relates to a method for approximately determining the actual torque transmitted by a clutch of a drive train of a vehicle.

In the case of parallel hybrid vehicles, the crankshaft of the internal-combustion engine is typically connected by way of a separating clutch with a transmission input shaft on which an electric machine is arranged. The transmission input shaft can therefore optionally be driven by the internal-combustion engine or by the electric machine, or simultaneously by the internal-combustion engine and the electric machine. The transmission usually is an automatic transmission which has an "integrated start-up element", i.e. a clutch designed for start-up operations.

So-called "full-hybrid vehicles" can also drive without an internal-combustion engine, i.e. purely electrically. In the purely electric operation, the separating clutch arranged between the crankshaft of the internal-combustion engine and the transmission input shaft is open and the internal-combustion engine is switched off.

For a transition to the internal-combustion engine driving operation or to a "mixed operation", in which the vehicle is driven by the internal-combustion engine as well as by the electric machine, the internal-combustion engine has to be additionally started from the purely electric driving operation.

Many hybrid concepts known so far have provided a separate additional-start system for this purpose. In those cases, the internal-combustion engine is not started by the electric machine assigned to the drive train but by a separate "starter". After a synchronization of the rotational speed of the crankshaft with the rotational speed of the electric machine of the hybrid drive, the separating clutch is closed and the internal-combustion engine can provide torque for driving the vehicle.

A separate additional-start system has the advantage that the electric machine of the hybrid drive is not, or not directly, influenced by the additional start of the internal-combustion engine. However, a separate additional-start system has the disadvantage of further expenditures connected with such a system. In addition, the 14 V onboard power supply system has to be expanded requiring additional cost, in order to limit voltage drops during the starting operation of the internal-combustion engine. A separate additional-start system is usually coupled with the internal-combustion engine by way of a belt drive. Such a belt drive requires additional installation space in the longitudinal direction of the vehicle.

As a result of multiple technical marginal conditions, it is frequently not easily possible to do without a separate additional-start system. If one were to additionally start the internal-combustion engine in the electric driving operation by way of the electric machine of the hybrid drive by closing the separating clutch, a knowledge of the torque transmitted by the separating clutch would be required that is as accurate as possible, for a "high-quality control" of the additional-start operation (avoidance of torque fluctuations at the driving wheel of the vehicle).

It is an object of the invention to provide a method of "approximately determining" as precisely as possible the actual torque transmitted by a clutch of a drive train of a vehicle, particularly a hybrid vehicle.

This and other objects are achieved by providing a method for approximately determining the torque actually transmitted by a clutch of a drive train of a vehicle, having the steps of: setting a closed state of the clutch and transmitting a torque by way of the drive train; providing a state space model showing the drive train; determining a torque which can theoretically be transmitted or is transmitted by the clutch in the closed state; approximately determining the torque actually transmitted by the clutch, by adding the theoretically transmittable or transmitted torque and a disturbance torque determined by calculation, wherein the disturbance torque is determined on the basis of (i) the state space model and a Kalman filter, as well as (ii) actual rotational speeds of individual drive train components and/or actual torques transmitted by individual drive train components.

Clutches, particularly separating clutches, as installed in drive trains of vehicles, are usually hydraulically or electro-hydraulically activated. Even when the diverse parameters (for example, hydraulic control pressure, clutch temperature, etc.) are known at which or below which the control device of the clutch is activated, only a relatively rough conclusion can be drawn therefrom concerning the torque that can be transmitted by the clutch or concerning the torque actually transmitted by the clutch. Specifically, the torque transmitted by a clutch depends on a plurality of partially unknown or only approximately known parameters (such as a state of wear of the clutch, the oil temperature and the respectively correlating viscosity, etc.).

The starting point of the invention is the idea of considering the torque that can actually be transmitted or is transmitted by a clutch as the sum of a "torque introduced by way of the clutch activation" or a "theoretically transmitted or transmittable torque" and a "disturbance torque" which may be influenced by a plurality of disturbance factors.

The basic principle of the invention consists of the fact that the disturbance torque (in the control-related sense) is to be determined by a disturbance variable observation by use of a state estimator, for example, by way of a Kalman filter.

In order to improve the accuracy of the determination of the torque actually transmitted by the clutch, the clutch torque is introduced as a "state of a state space model". The clutch torque computed from the hydraulic activation (theoretically transmitted or transmittable torque) is additionally corrected by way of a disturbance variable observation. It may be provided that the correction of the Kalman filter is active only at the moment of the additional start of the internal-combustion engine. It should orient itself according to the clutch rotational speed error (clutch rotational speed=rotational speed difference between the internal-combustion engine and the electric machine) between the model and reality.

The better the torque actually transmitted by the clutch is known, the better the internal-combustion engine starting torque superimposed on the drive train during the additional start of the internal-combustion engine can be compensated. The better the internal-combustion engine starting torque can be compensated, the less the effects of the additional start upon the drive torque of the driven wheels and the higher the driving comfort.

The prerequisite of an approximate determination of the torque actually transmitted by the clutch is the providing of a "state space model" showing the drive train. The term "drive train" applies, for example, to the totality of the torque-transmitting components, from the internal-combustion engine or the crankshaft of the internal-combustion engine to the driven wheels of the vehicle.

When closing the considered clutch (i.e. the clutch whose torque is to be determined), on the basis of a predefined physical model of the clutch and of the introduced closing parameters (for example, introduced hydraulic pressure, etc.), a torque is determined that can theoretically be transmitted or is transmitted by the clutch.

The torque actually transmitted by the clutch may differ from the torque that can be theoretically transmitted or is transmitted, which is taken into account by adding the above-mentioned "disturbance torque".

The disturbance torque is determined on the basis of the state space model showing the drive train as well as on the basis of actual rotational speeds of individual drive train components and/or on the basis of actual torques which are actually transmitted by individual drive train components. Relative to the control, the disturbance torque is therefore determined by use of an observation of the state of the drive train. The actual rotational speeds or the actual torques, which enter into the state observation, can be measured directly or can be derived from other measured or otherwise determined or known state parameters of the drive train.

A significant advantage of the invention consists of the fact that, by means of the method according to the invention, the torque actually transmittable or transmitted by the clutch can be determined relatively accurately, which is a prerequisite for a high-quality control of the additional start of the internal-combustion engine from the purely electric driving operation. The invention thereby makes it possible to do without a separate additional-start system.

If the torque actually transmitted by a clutch of the drive train is known accurately or at least relatively accurately, based on the latter, the torque transmitted to the driven wheels of the vehicle can be controlled corresponding to the desired torque. As explained above, the disturbance torque describes a possible deviation of the torque than can actually be transmitted or is transmitted by the clutch from the desired torque introduced by way of the closing parameters.

According to a further aspect of the invention, the disturbance torque can be compensated by impressing a compensation torque by way of the electric machine of the drive train on a rotating component of the drive train (for example, on the transmission input shaft), and/or by changing the introduced closing parameters of the clutch. In this manner, undesired cyclic rotating irregularities in the drive train can be reduced or eliminated, which is very significant not only for an additional start of the internal-combustion engine from the purely electric driving operation but also for an active vibration damping during the normal driving operation.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 illustrates a state space module of a typical parallel hybrid drive train of a vehicle.

DETAILED DESCRIPTION OF THE DRAWING

Referring to FIG. 1, a parallel hybrid drive train 1 of a vehicle has an internal-combustion engine 2 whose crankshaft provides a torque T_Vm. In the embodiment illustrated in FIG. 1, a crankshaft 3 of the internal-combustion engine 2 is connected by way of a torsional vibration damper 4 (or by way of a combination of a torsional vibration damper and a "centrifugal pendulum-type absorber") with an input side 5 of a separating clutch 6, which here is also indicated by the symbol "K0". The separating clutch (6 or K0) transmits an actual torque T_K0 to an output element 7 of the clutch K0. Here, the output element 7 is formed by a transmission input shaft of an automatic transmission 8.

As illustrated in the model shown in FIG. 1, the drive train 1 can essentially be described by the following torques:

T_Vm: Torque provided by the internal-combustion engine,

T_K0: Torque actually transmittable or transmitted by the separating clutch 6 or K0, T_EM: Torque exercised by an electric machine 14 of the hybrid drive train on the hybrid drive train 1, T_IAE: Torque exercised by an integrated start-up element of the transmission on the drive train 1, T_B: Braking torque exercised by vehicle brakes on drive wheels of the vehicle, and T_RL: Tractive resistance torques resulting, for example, from the slope of the road, aerodynamic drags of the vehicle, etc.

The drive train 1 of the vehicle can be shown relative to the control in a manner known to a person skilled in the art by means of a state space model. For a linear time-invariant multivariable system of the order n with r input quantities and m output quantities, it is known that the state space model can be represented by the following two equations:

$$dx(t)/dt = A \times (t) + B\, u(t);\ \text{and}$$

$$y(t) = C \times (t) + D\, u(t);$$

where x(t) describes a state vector; u(t) describes an input vector or control vector, and y(t) describes an output vector (observation vector). A is the system matrix describing the drive train; B is the input or control matrix; C is the output or observation matrix; and D is the so-called passage matrix.

By way of such a state space model, which takes into account several rotational speeds actually occurring in the drive train and/or several torques actually occurring in the drive train, as well as the torque introduced into the clutch K0, a disturbance torque occurring at the clutch K0 can be determined, which is superimposed on the desired torque introduced to the clutch K0 with respect to the torque $K0_{actual}$ that is actually transmitted by the clutch K0.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for approximately determining a torque actually transmitted by a clutch of a drive train of a vehicle, the method comprising the acts of:

setting the clutch in a closed state and transmitting a torque by way of the drive train of the vehicle;

providing a state space model which models the drive train of the vehicle;

determining a torque theoretically transmittable or which is transmitted by the clutch in the closed state;

calculating a disturbance torque, wherein the disturbance torque is determined based on: (i) the state space model and a Kalman filter, and (ii) actual rotational speeds of individual components of the drive train and/or actual torques transmitted by the individual components;

adding the theoretically transmittable or transmitted torque and the calculated disturbance torque to approximately determine the torque actually transmitted by the clutch of the drive train of the vehicle.

2. The method according to claim 1, wherein the torque theoretically transmittable or transmitted by the clutch in the closed state is determined by calculation based on a predefined physical model of the clutch and of the set closed state of the clutch.

3. The method according to claim 2, wherein the setting of the closed state of the clutch is carried out by a closing hydraulic system.

4. The method according to claim 1, wherein the setting of the closed state of the clutch is carried out by a closing hydraulic system.

5. A method for controlling torque transmitted by a drive train of a vehicle to driven wheels of the vehicle corresponding to a desired torque, the method comprising the acts of:

setting the clutch in a closed state and transmitting a torque by way of the drive train of the vehicle;

providing a state space model which models the drive train of the vehicle;

determining a torque theoretically transmittable or which is transmitted by the clutch in the closed state;

calculating a disturbance torque, wherein the disturbance torque is determined based on: (i) the state space model and a Kalman filter, and (ii) actual rotational speeds of individual components of the drive train and/or actual torques transmitted by the individual components;

adding the theoretically transmittable or transmitted torque and the calculated disturbance torque to approximately determine the torque actually transmitted by the clutch of the drive train of the vehicle; and compensating the disturbance torque observed at the clutch by impressing a compensation torque via an electric machine on a rotating component of the drive train and/or by changing the closed state of the clutch.

6. The method according to claim 4, wherein an internal-combustion engine drives the drive train, and further wherein the disturbance torque observed at the clutch and to be compensated is caused by an additional start of the internal-combustion engine.

* * * * *